United States Patent [19]

Foster

[11] Patent Number: 5,459,805
[45] Date of Patent: Oct. 17, 1995

[54] OPTICAL FIBRE CONNECTORS

[75] Inventor: Nigel S. Foster, Bitterne, Great Britain

[73] Assignee: ITT Corporation, New York, N.Y.

[21] Appl. No.: 244,013

[22] PCT Filed: Jul. 27, 1992

[86] PCT No.: PCT/GB92/01384

§ 371 Date: Aug. 4, 1994

§ 102(e) Date: Aug. 4, 1994

[87] PCT Pub. No.: WO93/14431

PCT Pub. Date: Jul. 22, 1993

[30] Foreign Application Priority Data

Jan. 16, 1992 [GB] United Kingdom ............... 9200875

[51] Int. Cl.⁶ .................................... G02B 6/32
[52] U.S. Cl. ................... 385/74; 385/33; 385/35; 385/52; 385/73; 385/80; 385/84; 385/78
[58] Field of Search .................... 385/31, 33, 52, 385/61, 66, 70, 72, 76, 78, 79, 80, 84, 139, 74, 73, 35

[56] References Cited

U.S. PATENT DOCUMENTS

| | | | |
|---|---|---|---|
| 4,632,505 | 12/1986 | Allsworth | 385/61 X |
| 4,759,601 | 7/1988 | Knutsen et al. | 385/61 X |
| 4,781,431 | 11/1988 | Wesson et al. | 385/61 X |
| 4,889,399 | 12/1989 | Mariani et al. | 385/35 X |
| 4,911,523 | 3/1990 | Sondergeld et al. | 385/35 X |
| 5,361,316 | 11/1994 | Tanaka et al. | 385/35 |

FOREIGN PATENT DOCUMENTS

| | | | |
|---|---|---|---|
| 0305832 | 3/1989 | European Pat. Off. | 385/33 X |
| 9102490 | 7/1992 | WIPO | 385/35 X |

Primary Examiner—Brian Healy
Attorney, Agent, or Firm—Freilich Hornbaker Rosen

[57] ABSTRACT

An optical fibre connector is provided which is of simple, dirt-resistant, and easily cleaned construction. The connector includes an outer body (1, FIG. 1) having a main bore (2), a ferrule (4) lying in precision sliding fit in the main bore, with an optical fibre (9) extending through the ferrule, a spacer (15) lying against the front of the ferrule, and a spherical lens (3) lying against the spacer. The outer member (1) has a larger second bore (10). A termination sleeve (8) lies in the second bore, presses forwardly on the ferrule, extends rearwardly through a stepped bore (11) in a securing member (12), and is biased forwardly by an elastomeric part (14) in the securing member. The spherical lens (3) has an anti-reflection coating and is bonded to the front surface (17) of the spacer.

8 Claims, 1 Drawing Sheet

OPTICAL FIBRE CONNECTORS

BACKGROUND OF THE INVENTION

This invention relates to optical fibre connectors and relates more specifically to such connectors of the so-called expanded beam type.

Expanded beam optical fibre connectors may comprise an least one convex (e.g. sphere) lens which is maintained in predetermined spaced alignment with the polished end face of an optical fibre which may be retained within the central aperture of a support ferrule (e.g. ceramic).

For the purpose of ensuring that the end face of the optical fibre is in precise active and mechanical spaced alignment with a sphere lens, the lens and the optical fibre terminating end of the ferrule may be seated against the respective surfaces of axially-spaced oppositely facing precision-machined conically-shaped cavities defined by the profile of a main bore of a lens/ferrule support structure which provides a relatively small bore extending between the respective cavities affording active alignment of the optical fibre end face relative to the sphere lens.

To avoid the need for providing such conical cavities which can only be precision machined from opposite ends of the main bore in the support structure for accommodating the lens/ferrule assembly, the sphere lens and the optical fibre terminating ferrule may be positioned in predetermined spaced relationship with each other by the interposition of a spacer plate between the lens and the fibre terminating end of the ferrule.

However, in a known construction of expanded beam connector a spacer plate is provided having a central aperture with a flared end portion on which the sphere lens is seated to provide the requisite alignment and spacing between the sphere lens and the end face of the ferrule-terminated optical fibre. The sphere lens, spacer and ferrule are held captive within a hollow cylindrical housing providing the aforesaid main bore and co-operating therewith to provide a discrete optical contact assembly for insertion into an aperture in a connector body. A plurality of such discrete contact assemblies may be positioned in respective apertures of the connector body in the case of a multi-way expanded beam optical connector.

The sphere lens, spacer plate and optical fibre-terminating ferrule of this known construction of connector are held captive in the housing by means of a tubular member which is a press fit in the housing and provides a fixed abutment for the end of the optical fibre terminating ferrule remote from the spacer-plate and sphere lens while radially inwardly deformed retention fingers formed integrally with the cylindrical housing bear directly against the sphere lens to retain the lens at the front end of the assembly.

Although this known construction of connector avoids the previously mentioned need for precision machining of the main bore profile from opposite ends thereof to provide conical seatings for the sphere lens and optical fibre terminating ferrule it does not provide for the ready removal of the sphere lens, spacer plate and optical fibre terminating ferrule from the main bore, such as to facilitate cleaning of the assembly component parts.

The present invention is directed therefore to an improved construction of optical fibre connector of the expanded beam type which facilitates the easy removal of the lens, spacer plate and ferrule components from the main bore of an assembly and which may avoid the use of a separate hollow cylindrical housing to provide the main bore for the lens, spacer and ferrule assembly components.

SUMMARY OF THE INVENTION

In accordance with the present invention there is provided an expanded beam optical fibre connector comprising at least one lens/optical fibre alignment assembly including an outer member having a main bore therein which accommodates a sphere lens or other lens means for producing an expanded beam and an optical fibre terminating ferrule which is a sliding fit in the main bore, in which the fibre terminating end of the ferrule abuts against one end of a spacer/alignment member which is also a sliding fit in the main bore and which is provided with a suitably-shaped recess for seating of the lens means to provide active alignment and the requisite spacing between the ferrule terminated end face of the optical fibre and the lens means, the arrangement of the lens means and the sliding fit of the spacer and ferrule facilitating the easy removal of the lens means, spacer/alignment member and ferrule from the main bore.

In carrying out the invention the lens means, spacer and ferrule may be held captive within the main bore by retaining means (e.g. apertured plate) removably located at the rear end of the connector.

Advantageously, the outer member of the lens/ferrule alignment assembly comprises the body of the connector to obviate the need for a separate outer member insertable into an existing bore in the connector body.

The sphere lens may be cemented or otherwise secured to the spacer member in the centralised condition of the lens in order to prevent rotation of the lens and interference with non-reflective coatings.

The invention is especially suitable for use in multi-way optical connectors since a plurality of lens/ferrule alignment assemblies as just above described may be accommodated in respective main bores of the connector body.

By way of example embodiments of the present invention will now be described with reference to the accompanying drawings in which:

DETAILED DESCRIPTION OF THE INVENTION

Figure 1:
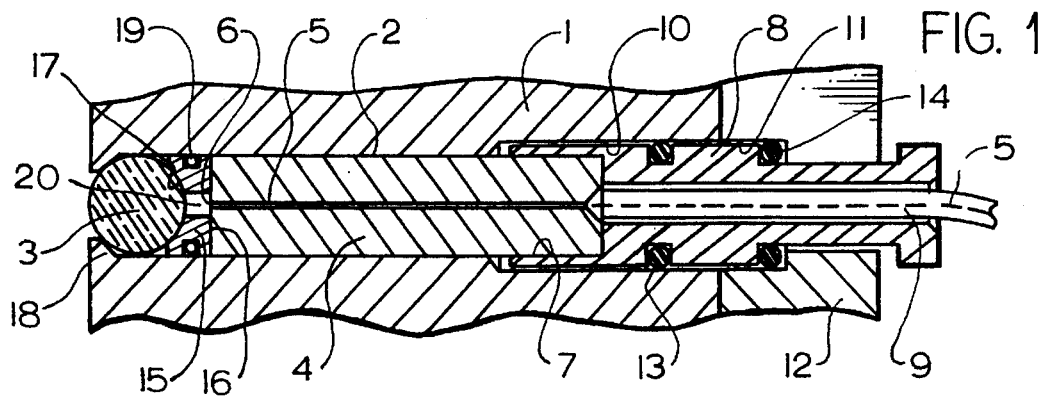
FIG. 1 shows an enlarged axial cross-sectional view of a lens/fibre alignment assembly of an expanded beam optical fibre connector.

Referring to FIG. 1 of the drawings, the lens/optical fibre alignment assembly illustrated comprises an outer or body structure 1 having a precision machined main bore 2 which contains a sphere lens 3 of glass or sapphire and a cylindrical ceramic optical fibre terminating ferrule 4 which is a precision sliding fit in the main bore 2 and which has bonded in a passageway extending centrally therethrough an optical fibre core 5 presenting a polished end face 6 towards the sphere lens 3. The right hand end of the ferrule 4 is fixed in a cylindrical recess 7 of a terminating sleeve 8 through which clad optical fibre 9 incorporating the core 5 extends.

In the present embodiment the sleeve 8 is sealed with respect to the wall of an enlarged end section 10 of the main bore 2 and with respect; to a stepped bore 11 of a securing member 12 by means of resilient (e.g. rubber) sealing "O" rings 13 and 14, respectively.

A spacer/alignment structure is provided in the form of an annular spacer plate 15 of stainless steel, for example, which is slidably located in the main bore 2 between the sphere lens 3 and the optical fibre terminating end of the ceramic ferrule 4. The spacer plate 15 lies in a precision sliding fit in the bore 2 and has a flat surface 16 at one end thereof against which the fibre terminating end of the ferrule 4 abuts and at the other end thereof a precision conically-shaped recess defining a surface 17 which is engaged by the sphere lens 3 and which serves to centralise and thereby align the lens 3 with precision relative to the polished end face 6 of the optical fibre core 5.

When the securing member 12 is mounted against the rear of the body 1, the "0" ring 14 is compressed, thereby producing a resilient force that urges the sleeve 8, ferrule 4, spacer plate 15 and lens 3 forwardly towards an inwardly extending lip 18 so that such parts will remain in firm physical contact with each other.

The annular spacer plate 15 is sealed substantially relative to the wall surface of the main bore 2 by means of a resilient "O" ring 19 (e.g. rubber) which is fitted into a peripheral groove in the spacer 15. The spacer plate 15 also includes a central passageway or aperture 20 extending between the surface of the centralised sphere lens 3 and the fibre end face 6 which is axially aligned with the centre of the sphere lens 3 and spaced from the sphere lens surface by the requisite distance for beam expansion purposes.

As will be apparent from the foregoing description the precision machining of the effective part of the main bore 2 of the outer or body structure 1 by a single boring operation from one end and the precision sliding fit therein of the ferrule 4 having an accurately positioned central passageway for the optical fibre core 5 ensure that the end face 6 of the optical fibre core 5 is aligned with the axis of the main bore 2. The precision sliding fit of the alignment spacer 15 in the main bore 2 and the surface 17 of the precision machined conically-shaped recess on which the sphere lens 3 is seated ensure that the centre of the sphere lens is in precise axial alignment with the optical fibre core 5, the distance of the end face 6 of the core 5 from the sphere lens surface being accurately predetermined by the length of the through passageway 20 in the spacer 15. Thus precise active and mechanical alignment of the optical fibre with the lens is achieved. The sphere lens 3 is cemented or otherwise bonded to the spacer 15 where the lens contacts the surface 17 of the recess for holding the lens in the centralised position thereof. This prevents rotation of the sphere lens and the consequential displacement of non-reflective coatings applied to front and rear major surface areas of the sphere lens from their effective angular positions in the expanded beam connector.

Moreover, the various component parts of the assembly including the sleeve 8, ferrule 4, spacer 15 and sphere lens 3 bonded to it can readily be removed from the rear end of the main bore 2 and the enlarged bore section 10, as for cleaning purposes, after withdrawal of the retaining plate member 12.

Figure 2:
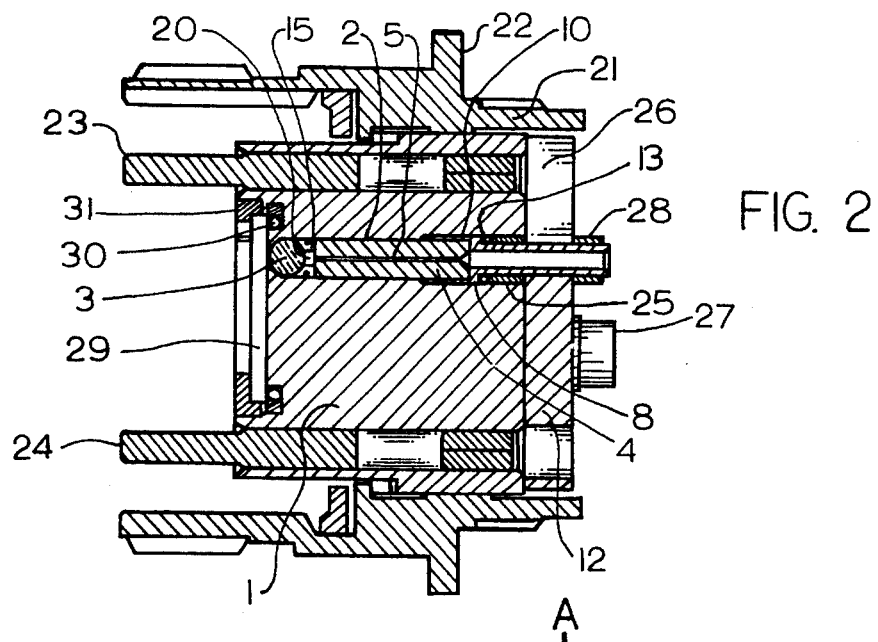
FIG. 2 shows a less enlarged axial cross-sectional view of a multi-way expanded beam optical fibre connector incorporating five lens/fibre alignment assemblies similar to that illustrated in FIG. 1; and, FIG. 3 is a front; end view of the multi-way connector shown in FIG. 2.
Figure 3:
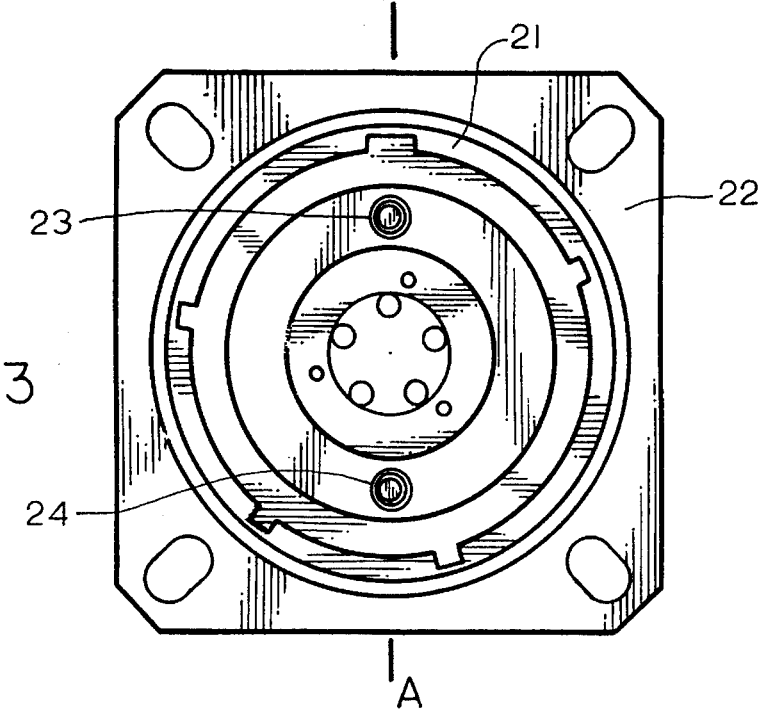

Referring now to FIGS. 2 and 3 of the drawings, these show a multi-way expanded beam connector which embodies, or at least has the capability of embodying, five lens/optical fibre alignment assemblies generally of the same construction as depicted in FIG. 1. Component parts of FIGS. 2 and 3 which are identical with or correspond to parts shown in FIG. 1 are provided with like designations.

The axial cross sectional view of FIG. 2 is taken along the line A:A in FIG. 3 as a consequence of which only one of the five alignment assemblies can be seen in FIG. 2.

As can be seen in FIG. 2, the sphere lens 3, apertured spacer plate 15, ferrule 4 and terminating sleeve 8 of the spacer/alignment assembly shown are located in one of five precision main bores extending in parallel and equally spaced relationship through the connector body 1 which is common to all five spacer/alignment assemblies. The connector body 1 is contained in a sub/assembly 21 including an apertured fixing plate 22. For the angular alignment of the connector relative to another similar connector to be coupled to it, forwardly projecting pins 23 and 24 are fixedly secured in holes extending through the connector body 1 and are adapted to be received in location holes in the corresponding body of the other connector.

As previously described with reference to FIG. 1, the sphere lens 3 is centralised in predetermined spaced relationship with the end face of the optical fibre 5 terminated in the ferrule 4 and the spacer/alignment components, also including the terminating sleeve 8 in which the rear end of the ferrule 4 is a press-fit, are firmly held captive within the main bore 2, with the sealing ring 14 being under compression, by means of a retaining plate 12. A spring (not shown) may be introduced between the plate 12 and the sleeve 8 to apply spring pressure to the sphere lens, spacer and ferrule assembly. In the FIG. 2 embodiment an additional sleeve 25 on the sleeve 8 is introduced into the enlarged main bore 10 between the sealing ring 13 and the front surface of the retaining plate 12 against which it abuts. In the present embodiment the plate 12 has a plurality of radial slots one of which is shown at 26 and the plate is simply secured to the connector body 1 by two retaining screws one of which is shown at 27. A collar 28 is fixed to the rear end of the terminating sleeve 8. As will be appreciated, all of the lens/alignment assemblies in the present embodiment can readily be removed, such as for cleaning purposes, from the rear end of the connector body 1, simply by removing the retaining plate 12.

At the front of the connector a protective transparent glass plate 29 is fitted in front of the sphere lenses and sealed relative to the connector body 1 by means of a sealing ring 30. A plate retaining ring 31 co-operates with a recess in the connector body 1 to hold the protective plate 29 securely in position.

It should be appreciated that modifications to the components of the lens/alignment assembly may be made without departing from the spirit of the invention. For example, although the spacer plate shown in FIG. 1 is provided with a conical recess for seating the sphere lens 3 a hemispherical recess might alternatively be used and, moreover, the use of lenses other than sphere lenses for expanded beam operation is also contemplated.

I claim:

1. An optical fibre connector comprising:
    an outer body having rear and front ends and having a body passage extending between said ends, said passage including a main bore with an axis;
    a ferrule lying in a precision sliding fit in said main bore and having a front end and a through passage extending along said axis to said ferrule front end;
    a spacer which lies in a sliding fit in said main bore forward of said ferrule and which has a hole and a spacer front end;

a spherical lens lying forward of said spacer and having a lens rear end abutting said spacer, said fibre extending through said ferrule passage with the fibre front end being approximately even with said ferrule front end;

a biasing part that engages said ferrule and biases it forwardly, with said biasing part, said lens, said spacer, and said ferrule being removable rearwardly from said main bore and out through the rear of said passage.

2. The connector described in claim 1 wherein:

said outer body passage has a second bore that lies rearward of said main bore and that is aligned with said main bore, and that is of greater diameter than said main bore; and said biasing part includes a termination sleeve lying within said second bore in a sliding fit of less precision than the sliding fit of said ferrule in said main bore, said sleeve having a sleeve passage extending along said axis, and said sleeve having a surface that abuts said ferrule to push said ferrule forwardly, and a resilient member that engages said sleeve and biases it forwardly.

3. The connector described in claim 2 including:

a securing member which lies immediately behind said outer body and which is detachable from said outer body, said securing member having a stepped bore with a forward portion aligned with said second bore of said outer body and with a narrower rear portion;

said termination sleeve has a rear portion lying in said forward portion of said stepped bore, and including a biasing member lying in said forward portion of said stepped bore and biasing said termination sleeve forwardly.

4. The connector described in claim 1 wherein:

said spacer member has a radially outer surface and an annular groove therein, and including an O-ring lying in said groove which seals against said main bore.

5. The connector described in claim 1 wherein:

said spacer member has a front end forming a recess, and said spherical lens nests in said recess and is bonded to said spacer member.

6. An optical fibre connector for terminating a front end of an optical fibre, comprising:

an outer body having a main bore with an axis;

a ferrule lying in a precision sliding fit in said main bore and having a ferrule front end and a through passage extending along said axis to said ferrule front end;

a lens lying forward of said ferrule;

said outer member has a second bore of larger diameter than said main bore and aligned with and extending rearward of said main bore;

a termination sleeve lying in a sliding fit within said second bore, said sleeve having a largely forwardly-facing surface abutting said ferrule and having an axially extending through passage, and said optical fibre extends through said passages in said termination sleeve and in said ferrule and is fixed to said ferrule;

said termination sleeve having a rear portion extending rearward of said outer member;

a securing member detachably fixed to said outer member and having a bore through which said rear portion of said sleeve extends, and including a resiliently deflectable member lying in said bore of said securing member and forwardly biasing said termination sleeve.

7. The connector described in claim 6 wherein:

said bore in said securing member has a forward portion and a smaller diameter rearward portion, and said resiliently deflectable member includes an elastomeric member lying against a rear end of said bore forward portion of said securing member and against said termination sleeve.

8. An optical fibre connector comprising:

an outer body having a main bore with an axis;

a ferrule lying in a precision sliding fit in said main bore and having a front end and a through passage extending along said axis to said front end;

a spacer which also lies in a precision sliding fit in said main bore forward of said ferrule and which has a hole and a front end;

a spherical lens lying forward of said spacer member and having a rear end abutting said spacer member, said fibre extending through said ferrule passage with the fibre front end being approximately even with said ferrule front end;

said spacer has a front end with a recess;

said spherical lens nests in said recess and is bonded to said spacer front end.

* * * * *